United States Patent
Meyendorff et al.

(10) Patent No.: US 7,222,875 B2
(45) Date of Patent: May 29, 2007

(54) CLOSE OUT RETAINER FOR SIDE AIR BAG CHUTE

(75) Inventors: John Meyendorff, Plymouth, MI (US); Israel Jaramillo, Canton, MI (US); Dave Williams, South Lyon, MI (US); Jerry Maroudis, Shelby Township, MI (US); Mark Folkert, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 379 days.

(21) Appl. No.: 10/878,337

(22) Filed: Jun. 28, 2004

(65) Prior Publication Data

US 2005/0285377 A1   Dec. 29, 2005

(51) Int. Cl.
*B60R 21/21* (2006.01)

(52) U.S. Cl. .................. 280/728.2; 280/730.2

(58) Field of Classification Search ............. 280/728.2, 280/728.3, 730.2; 29/407.09, 401.1
See application file for complete search history.

(56) References Cited

U.S. PATENT DOCUMENTS

| | | | |
|---|---|---|---|
| 5,364,123 A * | 11/1994 | Abramczyk et al. ..... | 280/728.2 |
| 5,470,098 A | 11/1995 | Szigethy et al. | |
| 5,678,854 A * | 10/1997 | Meister et al. ............... | 280/735 |
| 5,797,624 A * | 8/1998 | Lang et al. ................. | 280/741 |
| 6,073,959 A * | 6/2000 | Heinz et al. ................ | 280/729 |
| 6,106,004 A | 8/2000 | Heina et al. | |
| 6,209,906 B1 * | 4/2001 | DeWitt ..................... | 280/728.3 |
| 6,224,092 B1 * | 5/2001 | Sakamoto et al. ........ | 280/730.2 |
| 6,364,348 B1 | 4/2002 | Jang et al. | |
| 6,584,385 B1 * | 6/2003 | Ford et al. .................... | 701/36 |
| 6,921,105 B2 * | 7/2005 | Speelman et al. ........ | 280/728.3 |
| 2004/0056461 A1 * | 3/2004 | Blackburn .................. | 280/741 |

\* cited by examiner

*Primary Examiner*—Paul N. Dickson
*Assistant Examiner*—Laura B. Freedman
(74) *Attorney, Agent, or Firm*—Bill Panagos

(57) ABSTRACT

A close out retainer for a side air bag chute comprising at least two retainer pieces, a bar code wherein a portion of the bar code is printed on said at least two retainer pieces, and a strap connecting that retainer to the side air bag. This close out retainer increases the safety of side air bags by utilizing a retainer that ensures correct installation. Correct installation is only obtained when the bar code printed on each of at least two retainer pieces is aligned and complete.

4 Claims, 2 Drawing Sheets

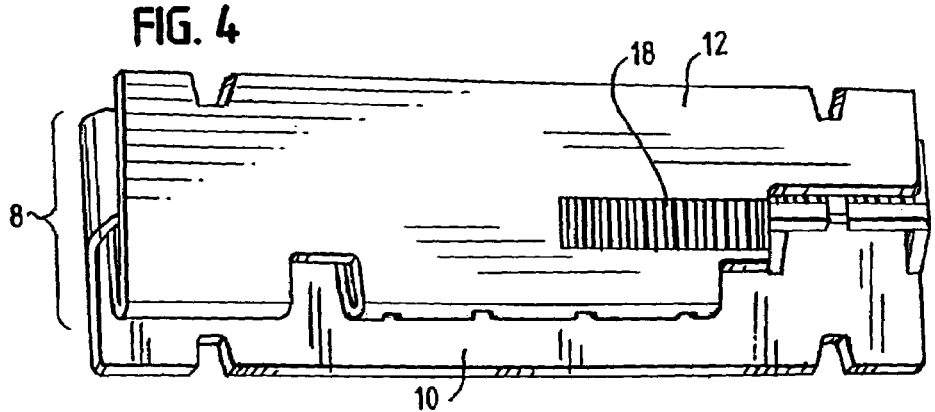
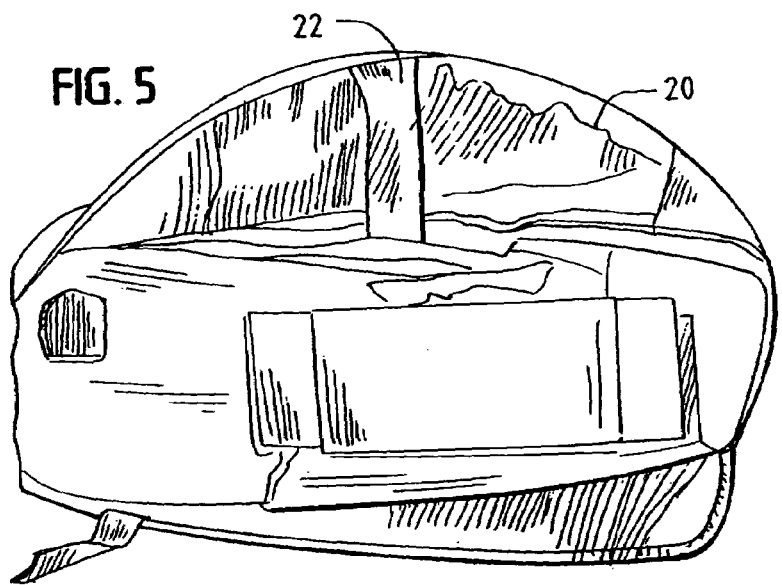
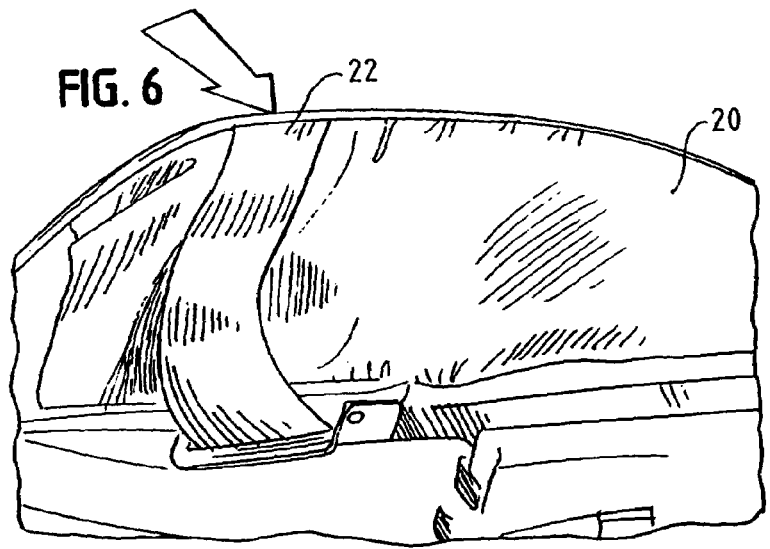

CLOSE OUT RETAINER FOR SIDE AIR BAG CHUTE

FIELD OF THE INVENTION

This invention relates to a retainer for a side air bag chute. More specifically, it relates to a close out retainer for a side air bag chute that utilizes a bar code for determining proper installation of the side air bag chute.

BACKGROUND OF THE INVENTION

Side air bags have become increasingly more popular in motor vehicles as the demand for safer vehicles increases. Side air bags are seen as a very effective way to protect occupants of a motor vehicle from severe injury due to a collision.

Current side air bag technology utilizes a retainer for attaching a side air bag to the vehicle. The retainer serves as an anchor for the air bag when it is deployed. The chute attaches the retainer and the side air bag. Typically, the only way the retainer is installed is by manual installation. At the point of manufacturing, the retainer is installed manually to the vehicle. The problem with installing the retainer in this manner is that there is no way to insure that it is properly installed. Manual installation leaves room for human error that can lead to serious consequences in the event that the side air bag is deployed and the retainer fails to function properly. This process is unreliable as there is no way to insure that the retainer will not break due to improper installation. If the retainer breaks, then the side air bag will not protect an occupant as it should. Consumers and manufacturers alike are not happy with the manner that the retainers are currently installed. As a result, there is a demand to further error-proof this installation.

This invention solves this problem by utilizes a bar code on the parts of the retainer. A portion of the bar code is imprinted on the parts of the retainer. When the retainer is engaged properly, the bar code is able to be scanned. A properly scanned bar code insures that the retainer is properly installed without having any worry that human error played a role in the correct or incorrect installation of the retainer. If the bar code cannot be read, then the retainer is not installed correctly. The worries of breaking or incorrect deployment are then removed from the manufacturing process.

SUMMARY OF THE INVENTION

A close out retainer for a side air bag chute comprising; at least two retainer pieces, a bar code wherein a portion of said bar code is printed on said at least two retainer pieces, and a strap connecting said retainer to said side air bag.

The at least two retainer pieces further comprise an inner retainer piece and an outer retainer piece. The inner retainer piece comprises the inner portion of the bar code. The outer retainer piece comprises the outer portion of the bar code.

The inner retainer piece joins the outer retainer piece to create the close out retainer. Once the inner retainer piece and out retainer piece are joined, the bar code is in its fully engaged position. In its fully engaged position, the bar code is able to be scanned and read. This only occurs when the inner retainer piece and outer retainer piece are in the exact orientation anticipated for proper function of the retainer.

DETAILED DESCRIPTION OF THE DRAWINGS

FIG. 4 depicts the retainer in an incorrect engaged position with the bar code not able to be scanned.

FIG. 5 depicts the side air bag installed within the door panel.

FIG. 6 depicts the side air bag and clearly shows the strap that attaches to the retainer that directs the movement of deployment of the side air bag.

DETAILED DESCRIPTION OF THE PREFERRED EMBODIMENT

Figure 1:
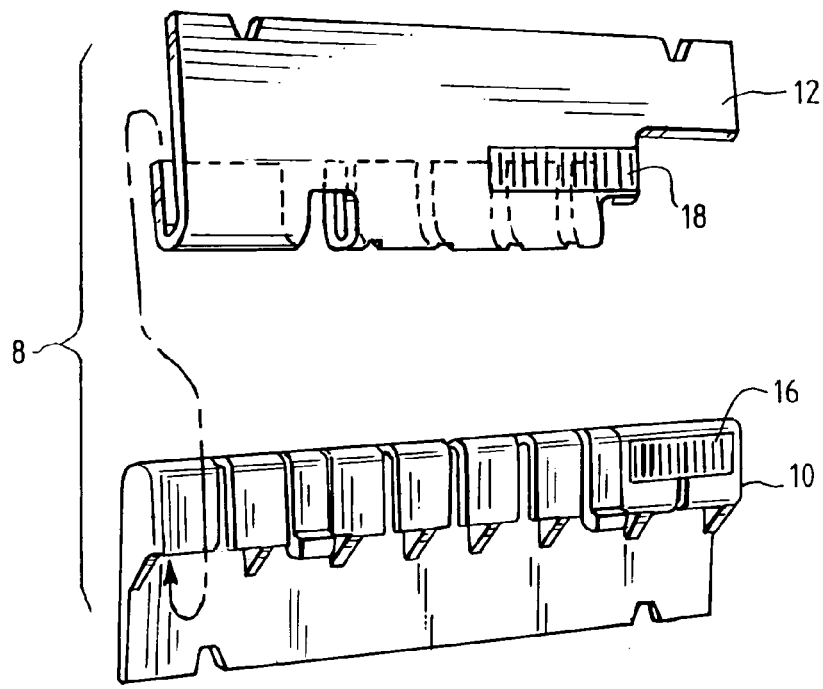
FIG. 1 depicts the retainer not engaged with both its inner retainer part and outer retainer part separated.
Figure 2:
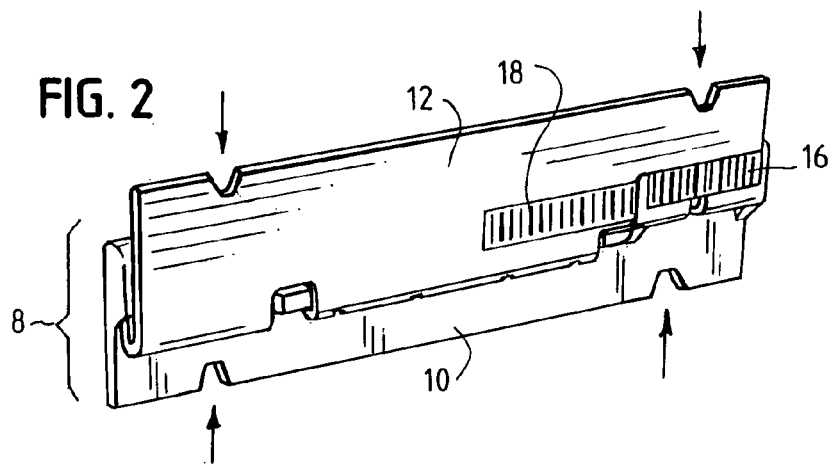
FIG. 2 depicts the inner retainer part and the outer retainer part moving towards its engaged position.
Figure 3:
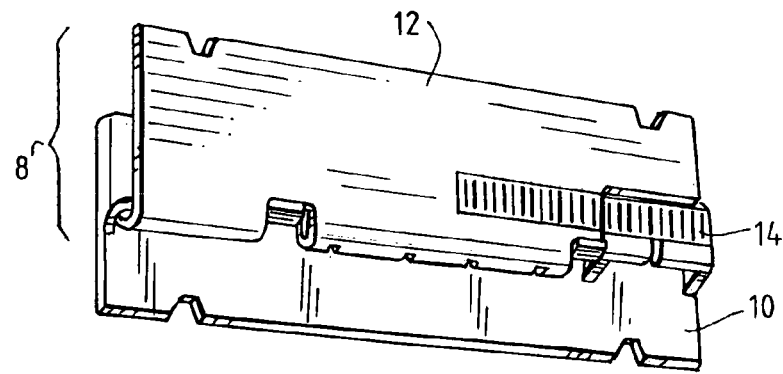
FIG. 3 depicts the retainer fully engaged the bar code able to be scanned.

This invention relates to a close out retainer 8 for a side air bag chute comprising at least two retainer pieces 10, 12, a bar code 14, wherein a portion of the bar code 14 is printed on each of the at least two retainer pieces 10, 12, and a chute, or strap, 22 connecting the retainer 8 to a side air bag 20. The at least two retainer pieces 10, 12 further comprise an inner retainer piece 10 and an outer retainer piece 12. The inner retainer piece 10 comprises the inner portion of the barcode 16. The outer retainer piece 12 comprises the outer portion of the barcode 18.

The inner retainer piece 10 and the outer retainer piece 12 fit together to make the retainer 8 that in conjunction with the chute 22 anchors the side air bag 20. When the inner retainer piece 10 and the outer retainer piece 12 are properly the engaged, the inner portion of the bar code 16 matches up with the outer portion of the bar code 18. When the two portions of the bar code 16, 18 are properly aligned, the retainer 8 is fully engaged and the bar code 14 is able to scanned and read. A proper scan and read indicates that the retainer 8 is properly installed.

When the retainer 8 is not properly engaged, then the bar code 14 cannot be properly scanned and read. In this instance, the retainer 8 is improperly installed and the inner portion of the bar code 16 does not match up to the outer portion of the bar code 18. When the bar code cannot be scanned or read properly, the installer will instantly know that there is a problem with the way the retainer 8 is installed.

This invention completely removes the possibility of human error at the point of installation. This will insure that the retainer 8 is installed as anticipated and the concerns over breaking or improper function are effectively removed. This leads to an overall greater standard of safety for the motor vehicle utilizing this device.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A close out retainer for a side air bag chute comprising:
   at least two mating retainer pieces;
   a bar code, wherein a different portion of said bar code is printed on each of said at least two mating retainer pieces; and
   a strap connecting said retainer to a side air bag.

2. The close out retainer for a side air bag chute as set forth in claim 1, wherein said at least two retainer pieces further comprise an inner retainer piece and outer retainer piece, said inner retainer piece comprising an inner portion of said bar code and said outer piece comprising an outer portion of said bar code.

3. The close out retainer for a side air bag chute as set forth in claim 2, wherein said inner retainer piece joins said outer retainer piece, creating said bar code in its engaged position.

4. The close out retainer for a side air bag chute as set forth in claim 3, wherein said bar code is only read correctly when said inner portion and outer portion of said bar code are joined properly and in the exact orientation anticipated for correct installation.

* * * * *